United States Patent
Joules

Patent Number: 5,887,883
Date of Patent: Mar. 30, 1999

[54] METHOD FOR TEACHING AN INDIVIDUAL TO OPERATE A BICYCLE

[76] Inventor: Reginald G. Joules, 8270 S. Steele Ct., Littleton, Colo. 80122

[21] Appl. No.: 585,523

[22] Filed: Jan. 16, 1996

[51] Int. Cl.$^6$ .................................................. G09B 9/04
[52] U.S. Cl. ............................................ 280/293; 434/61
[58] Field of Search ............................... 280/293, 288.4; 434/61

[56] References Cited

U.S. PATENT DOCUMENTS

| | | | |
|---|---|---|---|
| 4,850,588 | 7/1989 | Desjardins et al. | 482/51 |
| 5,006,072 | 4/1991 | Letovsky et al. | 434/61 |
| 5,154,096 | 10/1992 | Geller et al. | 280/293 X |
| 5,209,662 | 5/1993 | Fujita et al. | 434/61 |
| 5,240,417 | 8/1993 | Smithson et al. | 434/61 |

*Primary Examiner*—Robert J. Oberleitner
*Assistant Examiner*—Avraham H. Lerner
*Attorney, Agent, or Firm*—Timothy J. Martin; Michael R. Henson

[57] ABSTRACT

A method of teaching an individual to operate a bicycle is provided whereby the bicycle is place in the upright position on a support surface and its seat is adjusted to a height thereabove so that the individual can sit upright on the seat with both soles of his/her feet contacting the support surface and with the individual's hands placed on the bicycle steering mechanism to define a starting position. The individual is allowed to tilt the bicycle between left and right sides of the upright position and to manipulate the steering mechanism in the direction of these tilts, preferably for a selected period of time in a range of 30 to 60 seconds. Thereafter, the individual is repositioned on the bicycle in a ready position wherein the individual is situated upright on the seat with the individual's feet placed on the foot supports and the individual's hands placed on the steering mechanism. The bicycle is held in the upright position while preventing forward motion thereof and selectively titled with a plurality of tilting movements between left and right sides with the individual generating a response to each of these tilting movements, a correct response being a manipulation of the steering mechanism in a same direction as the tilting movement. During this time, the responses of the individual are monitored until the individual reacts with correct responses, each within a selected time interval that is preferably less that one second.

10 Claims, 2 Drawing Sheets

METHOD FOR TEACHING AN INDIVIDUAL TO OPERATE A BICYCLE

FIELD OF THE INVENTION

The present invention is broadly directed to a methodology that may be used to teach an individual to operate a vehicle. The present invention more particularly concerns a methodology of teaching an individual of almost any age to ride a bicycle in a short amount of time.

BACKGROUND OF THE INVENTION

For individuals who have never learned to ride a bicycle, the experience can be quite intimidating. Whether the pupil is a child or an adult, most fear the prospect of falling off the bicycle or going too fast to maintain control over its operation. Though children may be less cognizant than adults of the potential, latent dangers associated with operating a bicycle, fear is nonetheless prevalent. The psychological impact of this initial fear, coupled with an accompanying lack of concentration, can prolong the learning process. It is not until such time as this fear is overcome, which varies from individual to individual, that riding a bicycle becomes second nature.

In the past, the most prevalent technique employed to teach beginners, particularly youngsters, the skills needed to ride a bicycle was through the use of training wheels releasably attachable to the rearward frame of the bicycle. Training wheels are typically comprised of a pair of smaller wheels positioned a common distance from opposite sides of the rear wheel, and these smaller wheels operate to prevent the bicycle from toppling over while it is being ridden. Tricycles, of course, operate similarly to training wheels, with the exception that there is no rear wheel. The drawback of using training wheels as a teaching method, or tricycles for that matter, is that, although the individual develops steering skills and becomes accustomed to the drive train operation of the bicycle, the individual does not acquire the necessary balancing response which are required once the training wheels are removed. This is generally true because the individual has a tendency to become too dependent on the training wheels to provide balancing. Accordingly, the youngster still has a difficult time operating the bicycle effectively after the training wheels are removed.

Not everyone, of course, had the benefit of learning to operate a bicycle through the use of training wheels or tricycles. Older individuals, or those who simply did not own tricycles when growing up, likely learned to ride a bicycle with adult assistance. For most, this experience was memorable because the individual would mount the bicycle and pedal it while the adult followed alongside providing support to prevent the individual from falling. At some point, though, it would become necessary for the individual to pedal and steer the bicycle free of assistance. Almost inevitably, the individual would fall as he/she began to lose balance because the natural response would be to attempt to counteract the bicycle's movement by turning the steering wheel in the wrong direction. Of course, this only frustrates the learning experience because the individual is forced to overcome natural fears and learn to ride the bike through trial and error.

Accordingly, there remains a need to provide a new and improved method for teaching individuals of all ages the proper skills necessary to ride a bicycle. There is a further need to provide such a method which effectively eliminates much of the fear and anxiety inherent in the techniques which have been widely employed in the past. The methodology taught by the present invention is particularly adapted to meet these needs.

SUMMARY OF THE INVENTION

It is an object of the present invention to provide a new and improved method of teaching an individual to ride a bicycle.

Another object of the present invention is to provide a method of teaching an individual to operate a bicycle in a time effective manner.

A further object of the present invention is to provide such a method which may be employed with individuals of all ages with equal efficiency.

Still a further object of the present invention is to provide a new and improved method of learning to ride a bicycle which eliminates much of the fear and anxiety associated with those techniques which have prevailed in the past.

To accomplish these objectives, a methodology is provided to teach an individual to operate a bicycle in a time efficient manner. The bicycle has a first wheel controlled by a steering mechanism, a second wheel controlled by a drive assembly which includes a pair of foot supports, and a seat. Broadly, the methodology according to the invention comprises the following steps. First, the bicycle is placed in an upright position on a support surface. Next, the individual is positioned on the bicycle in a ready position wherein the individual is situated upright on the seat with each of the individual's feet placed on a respective one of the foot supports in with the individual's hands placed on the steering mechanism. The bicycle is then held in an upright position, with its forward motion prevented, and the bicycle is thereafter selectively tilted with a plurality of tilting movements between left and right sides of the upright position. This can be accomplished either manually or otherwise. A response to each of these tilting movements is generated by the individual, with a correct response being the manipulation of the steering mechanism in a direction that is the same as each of the tilting movements. Finally, the individual's responses are monitored until the individual reacts to the tilting movements with a correct response within a selected time interval, preferably less than one second.

Once the individual has become conditioned to respond properly, the methodology may include the step of advancing the bicycle in a forward direction for a selected distance while maintaining support on the bicycle. Thereafter, the support of the bicycle may be released so that the individual can operate the bicycle independently of assistance.

The method according to the present invention also contemplates the incorporation of at least one or more steps prior to the steps of positioning the individual on the bicycle in the ready position and selectively tilting the bicycle with the tilting movements. For example, the individual may initially be positioned on the bicycle in a starting position wherein the individual is situated upright on the seat with the individual's hand placed on the steering mechanism. Preferably, the seat is adjusted to a selected height so that the soles of individual's feet contact the support surface. The individual is then allowed to tilt the bicycle between the left and right sides of the upright position independently of assistance, and to manipulate the steering mechanism in the direction of tilt. These steps allow the individual to become accustomed to the feel of the bicycle prior to the remaining steps being performed. It is preferred that the individual be allowed to tilt the bicycle independently of assistance for a selected period of time which is in a range of approximately 30 to 60 seconds.

These and other objects of the present invention will become more readily appreciated and understood from a consideration of the following detailed description of the exemplary embodiment of the present invention when taken together with the accompanying drawings, in which:

DETAILED DESCRIPTION OF THE EXEMPLARY EMBODIMENT

Figure 1:
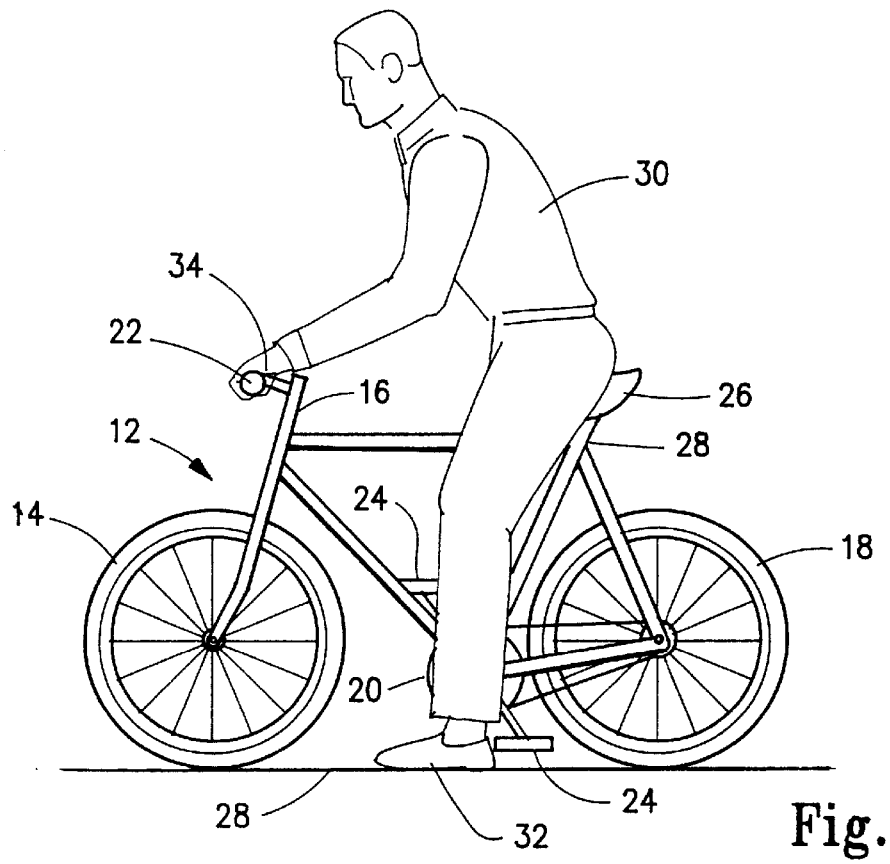
FIG. 1 is a side view in elevation showing one of the methodology steps according to the present invention in which an individual is positioned on a bicycle in a starting position.

The methodology according to the present invention provides a new and improved technique for teaching an individual to operate a bicycle within a short period of time, typically about five (5) minutes. From the discussion to follow, it should be appreciated by one of ordinary skill that the methodology contemplated herein may be used to teach individuals of all ages to ride a bicycle, and it is particularly adapted to condition the individual to rapidly overcome any initial fears commonly associated with this learning process.

The method of the present invention is generally illustrated in FIGS. 1–3(b). Here, a conventional bicycle 12 is provided that has a first wheel 14 controlled by a steering mechanism 16 and a second wheel 18 which is controlled by a drive assembly 20. Steering mechanism 16 is in the form of a conventional handle bar assembly having a pair of hand grips 22 and drive assembly 20 includes a pair of foot supports 24, or pedals, which rotate to impart forward or reverse motion to bicycle 12. Bicycle 12 is represented in FIGS. 1–3(b) to be a typical all-terrain vehicle, but it should be appreciated that the present invention contemplates a method of teaching an individual to operate a variety of different types of bicycles.

Figure 2:
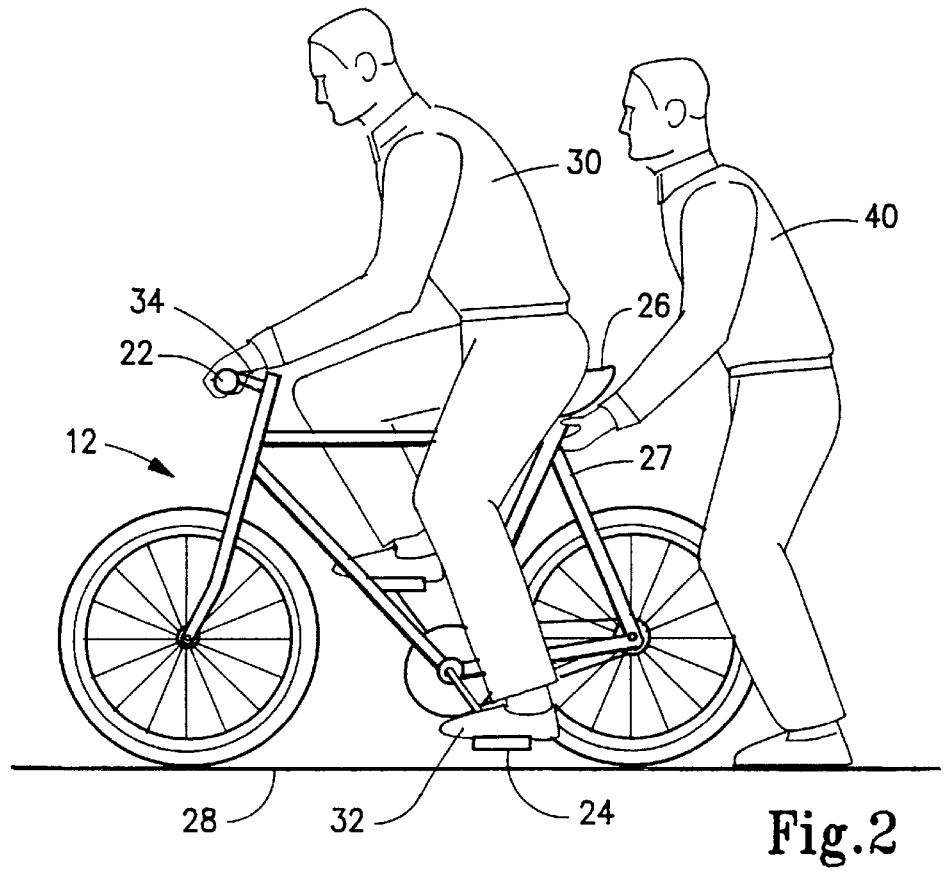
FIG. 2 is a side view in elevation of another one of the steps according to the methodology of the present invention in which an individual is positioned on a bicycle in a ready position and an instructor is positioned rearward of the bicycle to provide support.

As shown in FIG. 1, it is preferred that bicycle 12 initially be placed in an upright position on a support surface 28 and that an individual 30 be positioned on bicycle 12 in a starting position. In this regard, it is preferable that support surface 28 is a relatively level unobstructed area, such as a parking lot, to provide an open and safe environment for learning. In the starting position, individual 30 is situated upright on the bicycle's seat 26, with each of the individual's feet 30 placed on respective ones of the foot supports 24 and with the individual's hands 34 placed on hand grips 22. It should be noted that seat 26 is selectively adjusted to allow individual 30 be situated on bicycle 12 in the starting position. Accordingly, seat 26 is shown in FIGS. 1 and 2 to be positioned at its lowest vertical setting on seat post 28 to allow individual 30 to plant the soles of his/her feet 32 firmly on support surface 28.

When in the starting position, the individual is then allowed to tilt bicycle 12 between left and right sides of the upright position and to manipulate steering mechanism 16 in the direction of this tilting. This permits individual 30 to become accustomed to the feel of bicycle 12 and to condition himself/herself to turn first wheel 14 in the direction of the tilt, as discussed in more detail below with reference to FIGS. 3(a) and 3(b). Such a response is important because most beginners do not appreciate that a correct response to a tilting movement of bicycle 12 is to manipulate steering mechanism 16 so that first wheel 14 is turned in the direction of the tilt. The result of doing this is to urge the bicycle 12 back towards the upright position. It is preferred that individual 30 perform this step of tilting bicycle 12 between left and right sides of the upright position for a selected period of time. Typically, approximately 30 to 60 seconds is sufficient to allow individual 30 to become accustomed to the feel of bicycle 12.

Next, individual 30 is repositioned on bicycle 12 in a ready position wherein individual 30 is again situated upright on seat 26 with the individual's hands 34 placed on steering mechanism 16. Now, however, the individual's feet 32 are placed on respective ones of the foot supports 24 so that individual 30 assumes a riding position as shown in FIG. 2. Bicycle 12 is then held in the upright position and prevented from moving forwardly by an instructor 40 who is positioned rearwardly of bicycle 12. The instructor preferably grasps a rigid frame portion of the bicycle located proximately to the seat 26, such as the rear seat stay 27. Now, instructor 40 selectively tilts bicycle 12 between left and right sides of the upright position with a plurality of tilting movements. Because individual 30 can no longer rely on support surface 28 to retain balance, individual 30 now generates a response to each of these tilting movements as before, with a correct response being a manipulation of steering mechanism 16 in the same direction as each tilting movement.

Figure 3A:
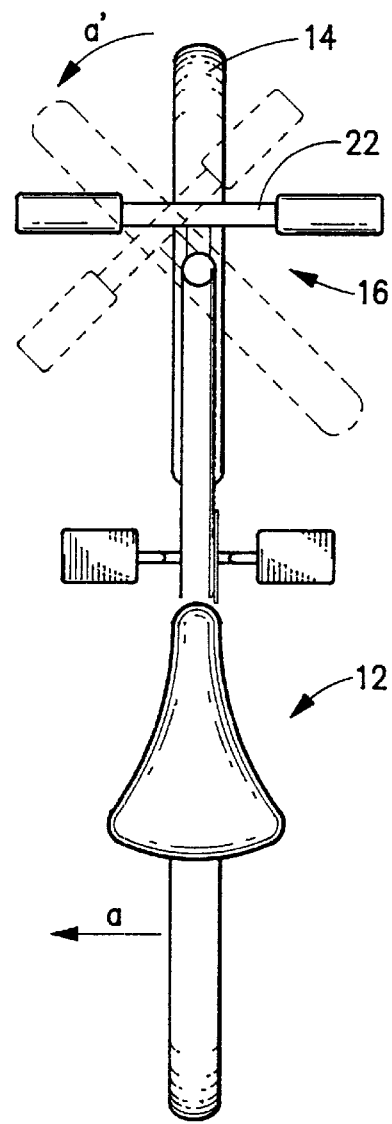
FIG. 3(a) is a top plan view of the bicycle of FIGS. 1 and 2 showing the correct response of the bicycle's steering mechanism as the bicycle is tilted to the left side.
Figure 3B:
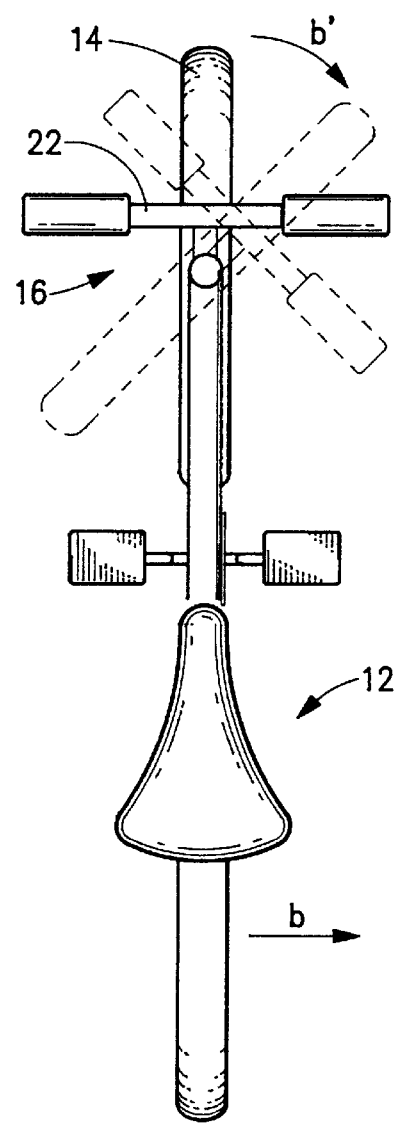
FIG. 3(b) is a top plan view of the bicycle in FIGS. 1 and 2 showing the correct response of the steering mechanism as the bicycle is tilted to the right side.

With reference to FIG. 3(a) then it may be appreciated that as bicycle 12 is tilted to the left side, as represented by arrow "a", the correct response is for individual 30 to manipulate steering mechanism 16 so that first wheel 14 turns in the direction of arrow "a'". Similarly, and with reference to FIG. 3(b), as bicycle 12 is tilted by instructor 40 to the right side in the direction of arrow "b", a correct response is for individual 30 to manipulate steering mechanism 16 so that first wheel 14 moves in the direction of arrow "b'".

It is preferred that instructor 40 repetitively tilt bicycle 12 to the left and right sides and concurrently monitor the responses of individual 30 until individual 30 reacts to these tilting movements with correct responses within a selected time interval. Typically, individual 30 has been conditioned to generate correct responses when less than one second elapses between the initial tilting of bicycle 12 by instructor 40 and the generation of a proper response by individual 30.

Once individual 30 has been conditioned to respond properly to the tilting movements by generating consecutive correct responses, at least ten (10) for example, without error, bicycle 12 may be advanced in a forward direction. Instructor 40, thus, may initially urge bicycle 12 forward and individual 30 is encouraged to pedal bicycle 12 in the forward direction to maintain forward progress. At this point, instructor 40 releases support of bicycle 12 so that individual 30 may operate bicycle 12 independently of assistance. At this time, individual 30 will be able to operate bicycle 12 properly because, he/she has now been trained to correctly react to any tilting which might occur.

Based on the foregoing, it should be appreciated that the steps of having an instructor tilt the bicycle between left and right sides could instead be accomplished by an appropriate device which operates to function in the same manner. Moreover, this same device could also be constructed to urge the bicycle forward once the individual has been conditioned to generate correct responses. Accordingly, while the methodology herein has been discussed in the context some of the steps being performed manually by an instructor 40, this is not necessary. One of the advantages, though, of having another person present while the beginner is learning to ride the bicycle is that this person can verbally encourage the beginner during the learning process.

It should also be understood from the foregoing that not all of the steps discussed herein need to be performed in order for an individual to learn to operate a bicycle effectively. For example, the initial steps whereby the individual was positioned in the starting position with the his/her feet contacting the support surface and thereafter allowed to tilt the bicycle between left and right sides of the upright position would not necessarily be required in all circumstances. Thus, the methodology discussed herein can be appropriately tailored to the particular individual to be taught.

Accordingly, the present invention has been described with some degree of particularly directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

I claim:

1. A method of teaching an individual to operate a bicycle which has a first wheel controlled by a steering mechanism, a second wheel controlled by a drive assembly having a pair of foot supports, and a seat, comprising the steps of:

(a) placing the bicycle in an upright position on a support surface;

(b) adjusting the seat of the bicycle to a height above the support surface so that the individual can sit upright on said seat with both soles of his/her feet contacting the support surface and thereafter positioning the individual on the bicycle in a starting position wherein the individual is situated upright on the seat with the individual's hands placed on the steering mechanism;

(c) allowing the individual to tilt the bicycle between left and right sides of the upright position and to manipulate the steering mechanism in a direction of said tilting;

(d) repositioning the individual on the bicycle in a ready position wherein the individual is situated upright on the seat with each of the individual's feet placed on a respective one of the foot supports and with the individual's hands placed on the steering mechanism; and (e) holding the bicycle in the upright position while preventing forward motion thereof and thereafter selectively tilting the bicycle with a plurality of tilting movements between left and right sides of the upright position with the individual generating a response to each of said tilting movements with a correct response being a manipulation of the steering mechanism in a same direction as each of said tilting movements; and (f) monitoring the responses of the individual to the tilting movements until the individual reacts with correct responses thereto, each within a selected time interval.

2. The method according to claim 1 wherein step (c) is repeated for a selected period of time.

3. The method according to claim 2 wherein the selected period of time is in a range of 30 to 60 seconds.

4. The method according to claim 1 including the step of returning the bicycle to the upright position after the individual reacts with correct responses.

5. The method according to claim 1 wherein the selected time interval is less than one second.

6. The method according to claim 5 wherein steps (e) and (f) are repeated until the individual consecutively generates correct responses for a selected number of tilting movements.

7. The method according to claim 6 wherein the selected number of tilting movements is at least ten (10).

8. The method according to claim 6 including the step of advancing the bicycle in a forward direction once the individual has become conditioned to generate correct responses to the tilting movements.

9. The method according to claim 8 including the step of releasing support of the bicycle so that the individual may operate the bicycle independently of assistance.

10. The method according to claim 1 wherein step (e) is performed manually.

* * * * *